US010612951B2

(12) United States Patent
Chen et al.

(10) Patent No.: US 10,612,951 B2
(45) Date of Patent: Apr. 7, 2020

(54) OPTICAL FLOW SENSOR, METHODS, REMOTE CONTROLLER DEVICE, AND ROTATABLE ELECTRONIC DEVICE

(71) Applicant: PixArt Imaging Inc., Hsin-Chu (TW)

(72) Inventors: Hsin-Chia Chen, Sunnyvale, CA (US); Sen-Huang Huang, Hsin-Chu (TW); Wei-Chung Wang, Hsin-Chu (TW); Chao-Chien Huang, Hsin-Chu (TW); Ting-Yang Chang, Hsin-Chu (TW); Chun-Wei Chen, Sunnyvale, CA (US)

(73) Assignee: PixArt Imaging Inc., Hsin-Chu (TW)

( * ) Notice: Subject to any disclaimer, the term of this patent is extended or adjusted under 35 U.S.C. 154(b) by 330 days.

(21) Appl. No.: 15/609,023

(22) Filed: May 31, 2017

(65) Prior Publication Data

US 2018/0348032 A1    Dec. 6, 2018

(51) Int. Cl.
*G01F 1/708* (2006.01)
*G01F 1/712* (2006.01)
*G06T 7/246* (2017.01)
*G01P 5/26* (2006.01)

(52) U.S. Cl.
CPC ............ *G01F 1/7086* (2013.01); *G01F 1/712* (2013.01); *G06T 7/246* (2017.01); *G01P 5/26* (2013.01); *G06T 2207/10016* (2013.01); *G06T 2207/10032* (2013.01); *G06T 2207/30252* (2013.01)

(58) Field of Classification Search
CPC .............................. G06T 7/246; G01F 1/7086
See application file for complete search history.

(56) References Cited

U.S. PATENT DOCUMENTS

| | | | |
|---|---|---|---|
| 8,077,922 B1* | 12/2011 | Barrows | H01L 27/14609 382/107 |
| 10,228,691 B1* | 3/2019 | Pounds | B64C 9/00 |
| 10,269,257 B1* | 4/2019 | Gohl | H04N 13/128 |
| 2009/0225300 A1* | 9/2009 | Barrows | G01P 3/36 356/28.5 |
| 2011/0103657 A1* | 5/2011 | Kang | G06K 9/4609 382/128 |
| 2011/0128379 A1* | 6/2011 | Lee | G06K 9/00805 348/144 |
| 2011/0134242 A1* | 6/2011 | Loubser | G06K 9/00771 348/143 |
| 2017/0109864 A1* | 4/2017 | Ohba | G06T 3/4015 |
| 2017/0180729 A1* | 6/2017 | Wu | H04N 19/172 |
| 2017/0188046 A1* | 6/2017 | Wu | H04N 19/521 |
| 2017/0323459 A1* | 11/2017 | Ermilios | G06T 7/80 |

* cited by examiner

*Primary Examiner* — Marcus E Windrich
(74) *Attorney, Agent, or Firm* — Winston Hsu

(57) ABSTRACT

An optical flow sensing method includes: using an image sensor to capture images; using a directional-invariant filter device upon at least one first block of the first image to process values of pixels of the at least one first block of the first image, to generate a first filtered block image; using the first directional-invariant filter device upon at least one first block of the second image to process values of pixels of the at least one first block of the second image, to generate a second filtered block image; comparing the filtered block images to calculate a correlation result; and estimating a motion vector according to a plurality of correlation results.

21 Claims, 14 Drawing Sheets

OPTICAL FLOW SENSOR, METHODS, REMOTE CONTROLLER DEVICE, AND ROTATABLE ELECTRONIC DEVICE

BACKGROUND OF THE INVENTION

1. Field of the Invention

The invention relates to an optical flow sensing mechanism, and more particularly to a novel optical flow sensor, method, remote controller device, and rotatable electronic device.

2. Description of the Prior Art

Generally speaking, image sensor mechanisms may be applied to different products or devices such as an optical mouse navigation device, a remote controlling scheme, and/or an unmanned aerial vehicle. In a conventional optical mouse navigation algorithm, no filters or fixed filters are applied on the image to enhance features captured from a working surface. On the other hand, a lighting controller system was applied to light up the working surface when all of sensor pixels are exposable; that is, the uncontrollable ambient light is not used as a main reference for the conventional optical mouse navigation algorithm. Further, a conventional remote controller may be based on the interaction between an infrared (IR) sensor and IR LED beacons. Usually, a display device is implemented with an external sensing bar to detect the motion/control of the conventional remote controller. However, the hardware cost is increased due to the external sensing bar. Further, at least three image sensors in the same conventional optical flow sensor system are needed and employed to detect motion of an unmanned aerial vehicle thereby obtaining the six-axis data of the unmanned aerial vehicle. This, however, results in higher circuit cost.

SUMMARY OF THE INVENTION

Therefore one of the objectives of the invention is to provide an optical flow sensing method, optical flow sensor, remote controller device, and a rotatable electronic device, and so on, to solve the above-mentioned problems.

According to embodiments of the invention, an optical flow sensing method is disclosed. The method comprises: using a first image sensor to capture a first image and a second image; using a first directional-invariant filter device upon at least one first block of the first image to process pixel values of the at least one first block of the first image, to generate a first filtered block image; using the first directional-invariant filter device upon at least one first block of the second image to process pixel values of the at least one first block of the second image, to generate a second filtered block image; comparing the first filtered block image with the second filtered block image to calculate a first correlation result; and, estimating a motion vector according to a plurality of first correlation results.

According to the embodiments, an optical flow sensor is further disclosed. The optical flow sensor comprises a first image sensor, a first directional-invariant filter device, and a processor. The first image sensor is configured for capturing a first image and a second image. The first directional-invariant filter device is coupled to the first image sensor, applied for at least one first block of the first image to process pixel values of the at least one first block of the first image, to generate a first filtered block image, and is also applied for at least one first block of the second image to process pixel values of the at least one first block of the second image, to generate a second filtered block image. The processor is coupled to the first directional-invariant filter device and is configured for comparing the first filtered block image with the second filtered block image to calculate a first correlation result and for estimating a motion vector according to a plurality of first correlation results.

According to the embodiments, a remote controller device is further disclosed. The device comprises above-mentioned optical flow sensor, a control switch, and a processing circuit. The processing circuit is configured for detecting a status of the control switch and for outputting or reporting the estimated motion vector when detecting that the control switch is at an ON state.

According to the embodiments, a rotatable electronic device is further disclosed. The rotatable electronic device comprises an optical flow sensor which comprises a first image sensor, a first directional-invariant filter device, and a processor. The first image sensor is configured for capturing a first image and a second image. The first directional-invariant filter device is coupled to the first image sensor, and is applied for at least one first block of the first image to process pixel values of the at least one first block of the first image, to generate a first filtered block image, and also applied for at least one first block of the second image to process pixel values of the at least one first block of the second image, to generate a second filtered block image. The processor is coupled to the first directional-invariant filter device, and is configured for comparing the first filtered block image with the second filtered block image to calculate a first correlation result, and for estimating a motion vector according to a plurality of first correlation results.

According to the embodiments, at least one of the following advantages can be provided. The mechanism of the invention is capable of precisely estimating motion, planar rotation, or behavior of a rotatable electronic device such as an unmanned aerial vehicle, a virtual reality interactive device, or an augmented reality interactive device based on sensing results of merely two image sensors of the same optical flow sensor (or system). For example, this can effectively obtain the six-axis data of an unmanned aerial vehicle. Compared to the conventional optical flow scheme using at least three image sensors to obtain the six-axis data, the hardware costs can be significantly reduced. Further, a remote controller device can be arranged to adaptively generate and output the motion of a user' hand to a display device if it is implemented with the above-mentioned optical flow sensor of the embodiments, so that it is not required for the display device to be used with a sensor bar for sensing the motion of user's hand. To summarize, in the embodiments, novel optical flow sensors and corresponding methods are provided and can be applied into a variety of electronic devices thereby reducing the hardware costs and/or complexity of software computations.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
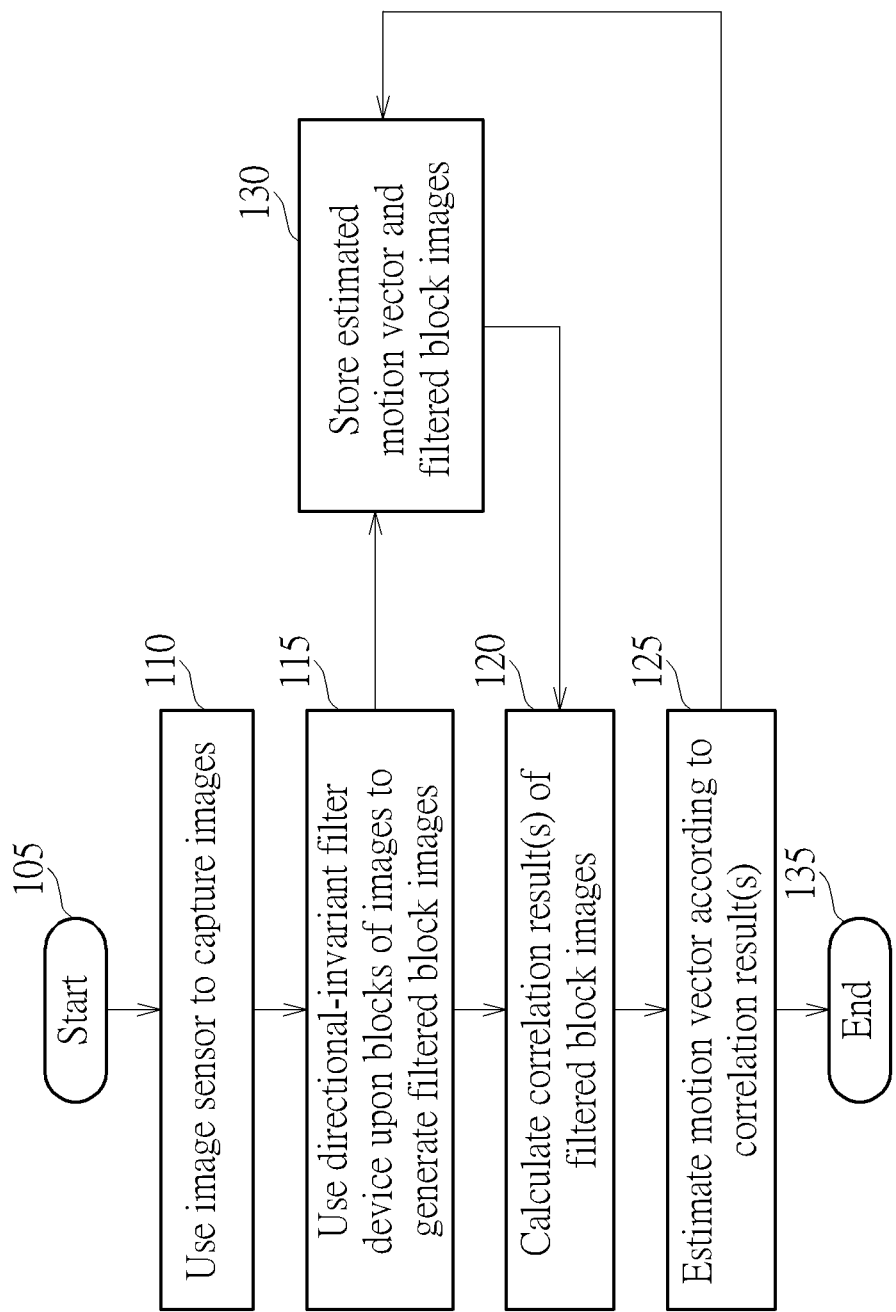
FIG. 1 is a diagram illustrating the flowchart of an optical flow sensing method according to a first embodiment of the invention.
Figure 2:
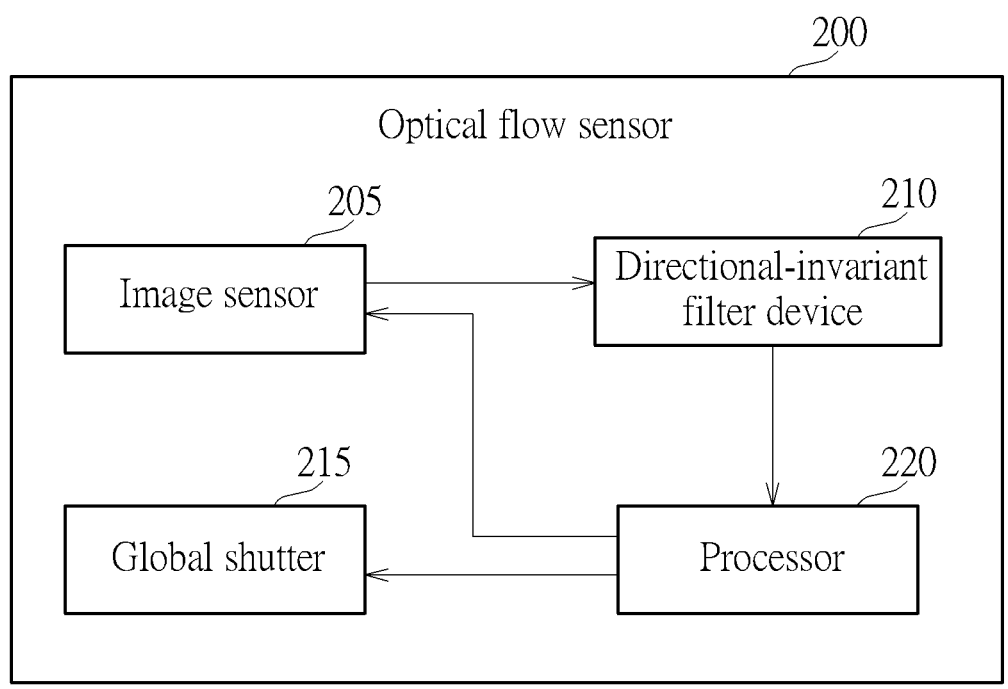
FIG. 2 is a block diagram of an optical flow sensor according to the embodiment shown in FIG. 1.

Please refer to FIG. 1 in conjunction with FIG. 2. FIG. 1 is a diagram illustrating the flowchart of an optical flow sensing method according to a first embodiment of the invention. FIG. 2 is a block diagram of an optical flow sensor 200 according to the embodiment shown in FIG. 1. The optical flow sensing method of FIG. 1 is applied into a single one optical flow sensor (i.e. the sensor 200) with a directional-invariant filter device and a global shutter mechanism. The optical flow sensor 200 comprises an image sensor 205, a directional-invariant filter device 210, and a global shutter 215, and a processor 220. Provided that substantially the same result is achieved, the steps of the flowchart shown in FIG. 1 need not be in the exact order shown and need not be contiguous, that is, other steps can be intermediate. Steps are detailed in the following:

Step 105: Start;
Step 110: Use the image sensor 205 to capture images;
Step 115: Use the directional-invariant filter device 210 upon blocks of the images to generate filtered block images;
Step 120: Calculate correlation result(s) of the filtered block images;
Step 125: Estimate a motion vector according to the correlation result(s);
Step 130: Store the estimated motion vector and the filtered block images; and
Step 135: End.

In practice, the processor 220 is used for controlling the image sensor 205 and global shutter 215 to capture images. The captured images are transmitted to the directional-invariant filter device 210 which is used for processing blocks (or called block images) of the captured images to generate filtered block images. The processor 220 receives the filtered block images to calculate correlation results to obtain motion vector estimation results.

Figure 3:
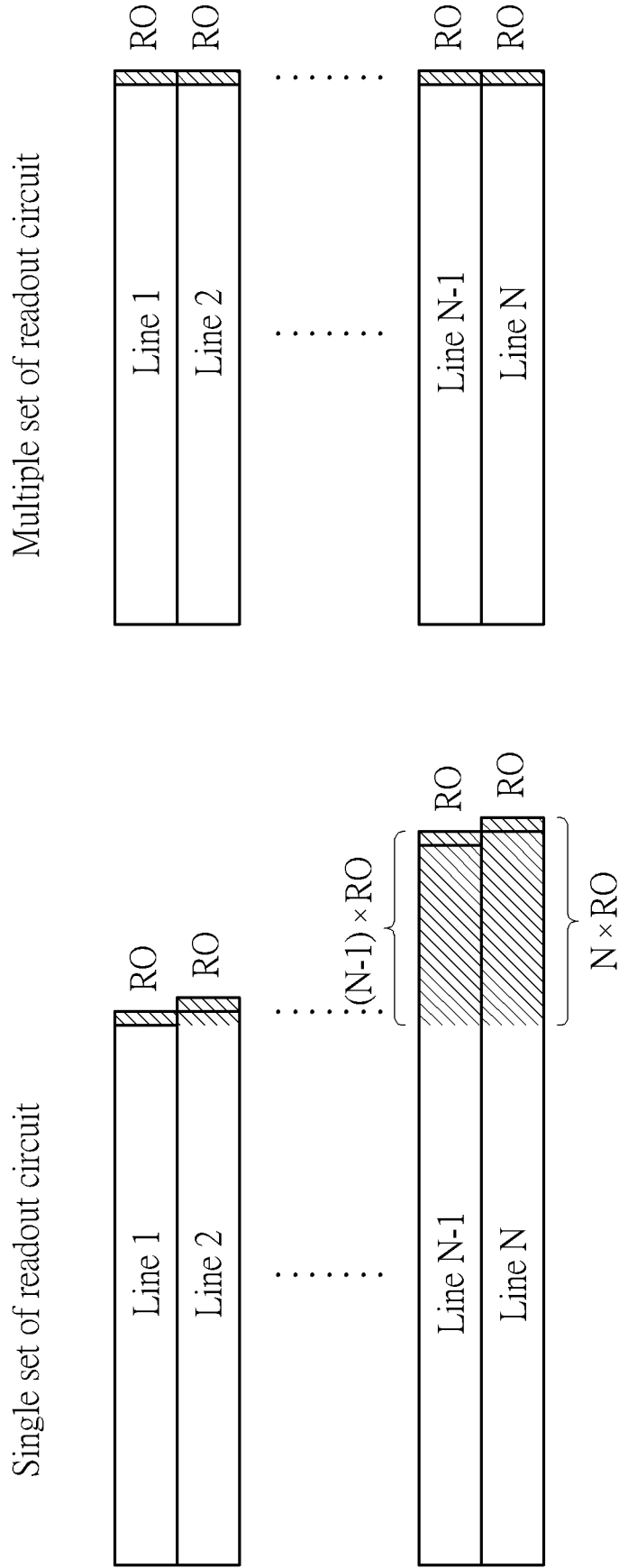
FIG. 3 is a diagram illustrating two different charge transfer mechanisms after the pixels are exposed to the same or similar amount of light such as the same environmental light.

In step 110, the image sensor 205 is used with the global shutter 215 in a global shutter mode in which every pixel in a frame is exposed simultaneously at the same instant in time, compared to a rolling shutter mode in which each row in a frame will be exposed for the same amount of time but the exposing begins at a different point in time. In addition, in the global shutter mode, pixels in each line of a frame are exposed to the same or similar amount of light such as the same environmental light. Unlike the conventional optical mouse enclosed system, the introduced optical flow sensor 200 utilizes the ambient light, which is uncontrollable, and the global shutter 215 is introduced to sense the reflected light. FIG. 3 is a diagram illustrating two different charge transfer mechanisms after the pixels are exposed to the same or similar amount of light such as the same environmental light. As shown in the left half of FIG. 3, a single set of readout circuit is employed for sequentially transferring sensed charges of pixels on multiple lines/rows to capacitors. RO means one time unit of charge transfer time for using such single set of readout circuit to transfer charges for pixels on single one line. Thus, using a single set of readout circuit to transfer charges of pixels on N lines needs to wait for a time period of N×RO. Alternatively, as shown in the right half of FIG. 3, multiple sets of readout circuit are employed for simultaneously transferring sensed charges of pixels on multiple lines/rows to capacitors. If N sets of readout circuit are employed for transferring charges of pixels on N lines, it merely needs wait for a time period of RO.

Figure 4:
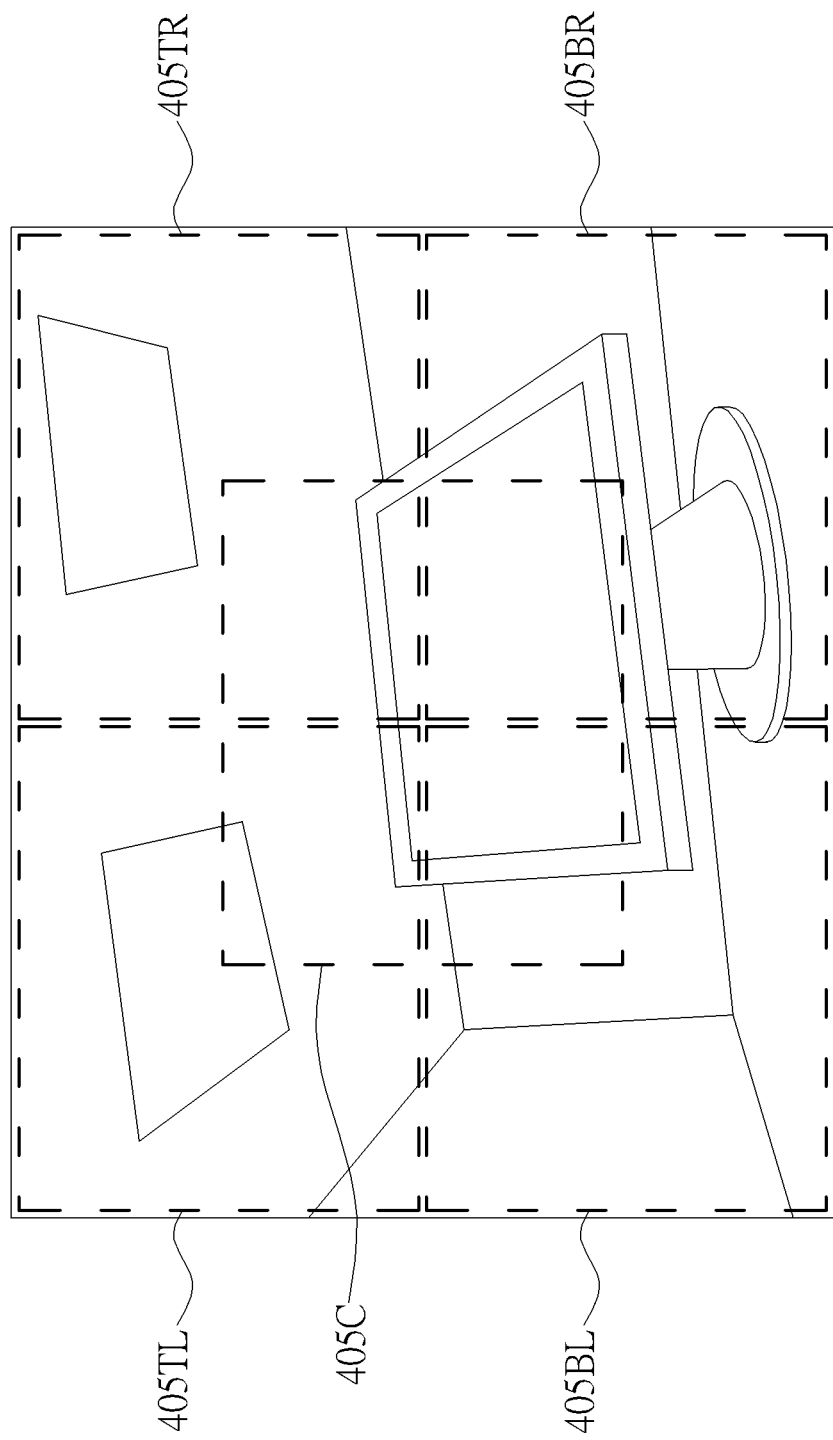
FIG. 4 is a diagram showing examples of different selections of blocks of an image (i.e. an entire frame).

The image sensor 205, for example, captures a first image and a second image at different timings. In Step 115, the directional-invariant filter device 210 is used for processing pixel values of at least one portion of the first image to generate at least one first filtered portion image and for processing pixel values of at least one portion of the second image to generate at least one second filtered portion image. For instance, the directional-invariant filter device 210 can be arranged to re-assign a corresponding value for each pixel of the at least one portion of the first image to generate at least one first filtered portion image and also to re-assign a corresponding value for each pixel of the at least one portion of the second image to generate at least one second filtered portion image. However, this is not meant to be a limitation, in other examples, the directional-invariant filter device 210 can be arranged to process the at least one portions of images to generate filtered images by interpolation and/or other pixel processing operations. In addition, for example, in the embodiment, the portion of first/second image may be defined as a block or a block image having M×N pixels wherein M and N indicate different or identical integers. That is, the directional-invariant filter device 210 may process at least one block of the first image to re-assign a corresponding value for each pixel of the at least one block of the first image to generate at least one filtered block image and may process at least one block of the second image to re-assign a corresponding value for each pixel of the at least one block of the second image to generate at least one filtered block image. Please refer to FIG. 4. FIG. 4 is a diagram showing examples of different selections of blocks of an image (i.e. an entire frame). As shown in FIG. 4, an entire frame/image can be defined as five blocks (but not limited). For example, FIG. 4 shows a top left block 405TL, a top right block 405TR, a bottom left block 405BL, a bottom right block 405BR, and a center block 405C; a block may has 200×200 pixels if the entire frame/image has 400×400 pixels. This is not meant to be a limitation. In addition, the blocks mentioned above can be configured to exclude a pixel, multiple pixels, or all pixels positioned at edges of frames. That is, the at least one first block of the first image excludes all pixels positioned at edges of the first image, and the at least one first block of the second image excludes all pixels positioned at edges of the second image. However, this is not intended to be a limitation. In other embodiments, each block can be configured to include pixel(s) positioned at edge(s) of a frame.

Further, in this embodiment, the directional-invariant filter device 210 is configured for processing blocks at the same spatial positions respectively within two different images. This is not meant to be a limitation. That is, the position of the block of the first image corresponds to that of the block of second image. In other embodiments, the directional-invariant filter device 210 may be used for processing blocks at different spatial positions respectively within two different images if necessary.

Figure 5:
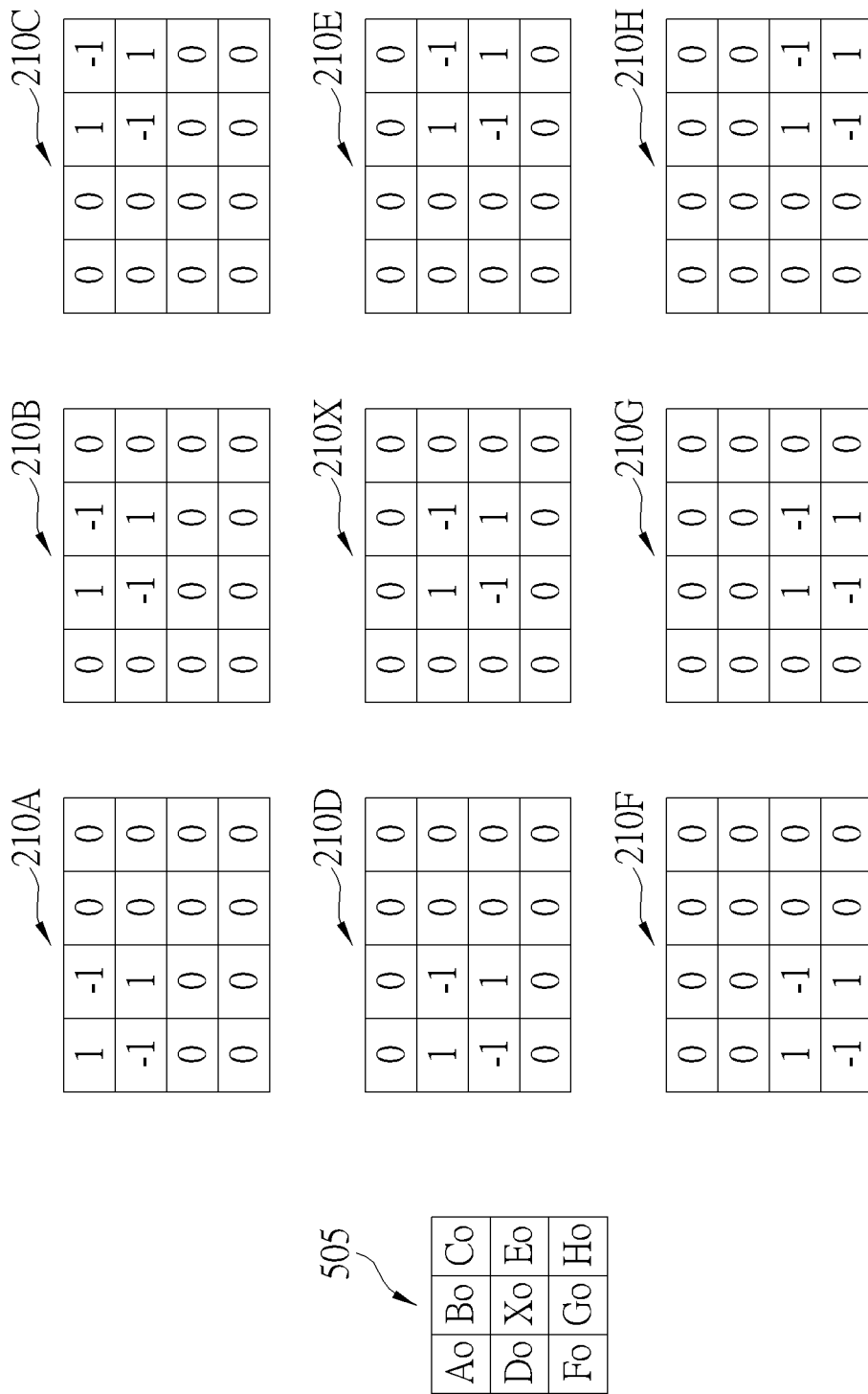
FIG. 5 is a diagram showing an example illustrating the operation of directional-invariant filter device in FIG. 2.

FIG. 5 is a diagram showing an example illustrating the operation of directional-invariant filter device 210 in FIG. 2. The directional-invariant filter device 210 is arranged for removing the directional characteristics of the portion of first/second image by performing enhancement tests with major possible directions for each pixel and its adjacent pixels and then selecting and assigning a minimum value among results of the enhancement tests for the each pixel as far as possible. As shown in FIG. 5, the directional-invariant filter device 210 comprises a plurality of directional adaptive filters (or referred as pre-processing filters) with different direction enhancements, and each directional adaptive filter is applied for the blocks of both first image and second image. For example, the directional-invariant filter device 210 includes nine directional adaptive filters 210A-210H and 210X with different filter matrices (as shown in FIG. 5). Each filters 210A-210H and 210X is applied on a block of an image or a portion of image to generate nine filtered outputs which can form a style box 505. The directional-invariant filter device 210 is then arranged to perform five tests based on the nine filtered outputs Ao–Ho and Xo on the style box 505. For example, a first test is a horizontal matching test based on the results of pre-processing filters 210D, 210X, and 210E. A second test is a vertical matching test based on the results of pre-processing filters 210B, 210X, and 210G. A third test is a diagonal matching test with the angle of 135 degrees based on the results of pre-processing filters 210A, 210X, and 210H. A fourth test is a diagonal matching test with the angle of 45 degrees based on the results of pre-processing filters 210C, 210X, and 210F. A fifth test is a flat matching test based on the results of pre-processing filters 210A, 210C, 210X, 210 F, and 210H. The directional-invariant filter device 210 calculates results of the five tests according to the following equations:

$V1=2Xo-(Do+Eo)$;

$V2=2Xo-(Bo+Go)$;

$V3=2Xo-(Ao+Ho)$;

$V4=2Xo-(Co+Fo)$;

$V5=(4Xo-(Ao+Co+Fo+Ho))/2$;

wherein V1-V5 respectively mean the five results of the five tests mentioned above, and Ao–Ho and Xo respectively indicate the results of the nine pre-processing filters.

The directional-invariant filter device 210 is arranged to use the nine pre-processing filters to generate filter outputs, perform the five tests upon each pixel of the block of the image based on the filter outputs, and then to assign a corresponding value for the each pixel based on the results of five tests. In the embodiment, the directional-invariant filter device 210 is to select a minimum value among the results of five tests as the corresponding value which is assigned to the each pixel. Alternatively, in other embodiments, the directional-invariant filter device 210 maybe arranged to select a maximum value among the results of five tests as a first value, select a minimum value among the results of five tests as a second value, and then calculate the difference between the first and second values. If the absolute value of the calculated difference is smaller than the result V5 of the fifth test, the directional-invariant filter device 210 is arranged to select the value of V5 as the corresponding value which is to be assigned for a pixel. If the absolute value is not smaller than the result V5 of the fifth test, the directional-invariant filter device 210 is arranged to select minimum value among the results of five tests as the corresponding value which is to be assigned for such pixel. After assigning corresponding values for all pixels within a block of the image, the directional-invariant filter device 210 outputs the assigned values as a filtered block image. The filtered block image is transmitted to the processor 220 and may be also stored in a storage device such as a memory (not shown in FIG. 2).

In Step 120, the processor 220 is arranged to calculate a correlation result of two filtered block images such as two filtered block images corresponding to two consecutive frames/images. The processor 220 performs the correlation calculation by comparing values of the two filtered block images. For example, the processor 220 may shift one pixel unit for all pixel values of one filtered block image to generate a shifted block image, then calculate the pixel difference between the shifted block image and the other filtered block image, and finally output the pixel difference as the correlation result of the two filtered block image. Alternatively, the processor 220 may multiplies pixels of the shifted block image with corresponding pixels of the other filtered block image respectively to generate multiplication results, and sum all the multiplication results as the correlation result of the two filtered block image.

Further, in other embodiments, the processor 220 can perform the correlation calculation by shifting a sub pixel unit for each pixel value of the filtered block images. For example, processor 220 can shift ½, ¼, ⅛, 1/16, or 1/32 pixel unit by performing interpolations upon the filtered block images. For instance, if each filtered block image has 200×200 pixels, the processor 220 may calculate and generate an interpolated pixel between every two adjacent pixels to achieve the shifting of ½ pixel unit.

Alternatively, in other embodiments, the processor 220 can perform interpolation upon the correlation results calculated from the filtered block images, instead of performing interpolation upon the filtered block images.

After calculating the correlation result(s), in Step 125, the processor 220 is arranged to estimate a motion to obtain a motion vector according to the correlation result(s). The processor 220 may transmit and store the estimated motion vector in the storage device of Step 130. Then, in next timing, the processor 220 may be able to read back the estimated motion vector at the previous timing to assist estimation/prediction of motion, to more accurately estimate the motion vector or reduce computation load. That is, an estimated motion vector at a previous timing can be further used as a reference to calculate a correlation result of another set of filtered block images at a later timing.

Figure 6:
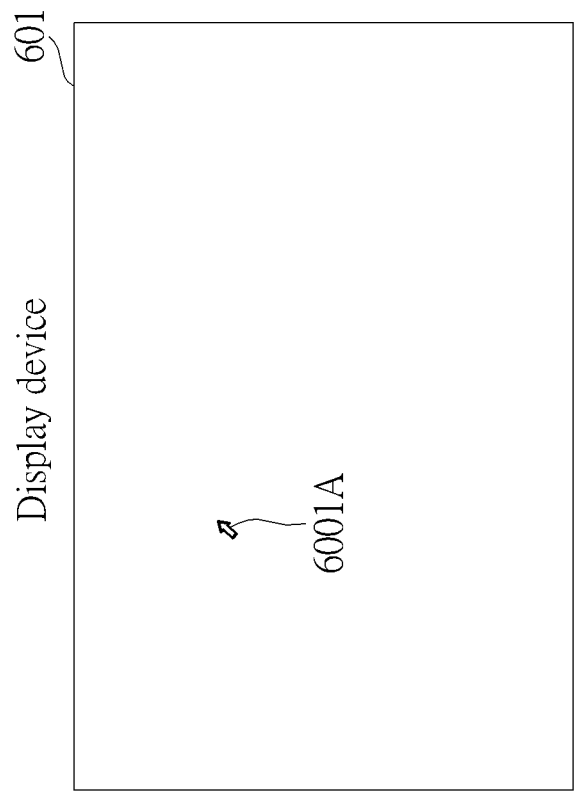
FIG. 6 is a block diagram of a remote controller device according to an embodiment of the invention.
Figure 6:
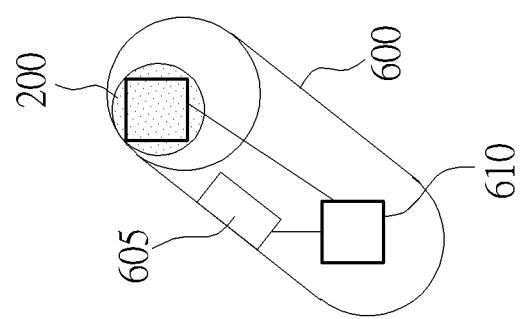

Further, in an embodiment, an external control switch may be installed on an electronic device implemented with the optical flow sensor 200, and the electronic device may be configured for detecting a status of the external control switch and the electronic device is arranged for outputting estimated motion vector(s) when the electronic device detects that the external control switch is at an ON state. For example, if a user controls and switches the external control switch to the ON state, the electronic device will be arranged for outputting the estimated motion vector(s). Please refer to FIG. 6, which is a block diagram of a remote controller device 600 according to an embodiment of the invention. The remote controller device 600 comprises the optical flow sensor 200 of FIG. 2, an external control switch 605, and a processing circuit 610. The processing circuit 610 is configured for detecting the status of the external control switch 605 and for outputting the estimation motion vector of optical flow sensor 200 when detecting that the external control switch 605 is at the ON state. For instance, the remote controller device 600 may be controlled by a user's hand, and the remote controller device 600 can appropriately transmit motion information of the user's hand to a display device 601 when the user controls the remote controller device 600 to control the motion of cursor 601A. In addition, a touch pad can be used to implement the external control switch 605. Compared to a conventional sensing scheme using a sensor bar to sense motion of a remote controller device, it is not needed to implement the display device 601 with a sensor bar for sensing the motion of the remote controller device 600. The remote controller device 600 itself can output and transmit its motion information to the display device 601.

Further, it should be noted that the optical flow sensor 200 mentioned above can be applied in a variety of electronic devices and products such as Unmanned Aerial Vehicle (UAV), Unmanned Aircraft System (UAS), Unmanned Underwater vehicle (UUV), Dynamic Remotely Operated Navigation Equipment (DRONE), remote controller device, virtual reality (VR) interactive device, augmented reality (AR) interactive device, and so on. For example, if the optical flow sensor 200 is applied into an unmanned aerial vehicle device having a Gyro sensor, a barometer, and an acoustic sensor, the unmanned aerial vehicle device can be arranged to obtain proportional integral derivate (PID) information from at least one of the Gyro sensor, barometer, and the acoustic sensor after obtaining an estimated motion vector outputted from the optical flow sensor 200. Then, the unmanned aerial vehicle device can calibrate the estimated motion vector by referring to the obtained proportional integral derivate information, and thus compensate motion of the unmanned aerial vehicle device based on the motion vector which has been calibrated. This can effectively improve the stability of motion of the unmanned aerial vehicle device. For example, the estimated motion vectors of the unmanned aerial vehicle device can be compensated based on PID information, and the compensated translations can be represented by the following equations:

$$T_x = -\frac{(V_x + W_y f)}{f} \times Z$$

$$T_y = -\frac{(V_y - W_x f)}{f} \times Z$$

wherein $(V_x, V_y)$ means Optical flow motion vectors, $(W_x, W_y)$ means angular velocities of X-axis and Y-axis, f and Z denotes the focal length and current distance to the scene, and $(T_x, T_y)$ means compensated translations.

Figure 7:
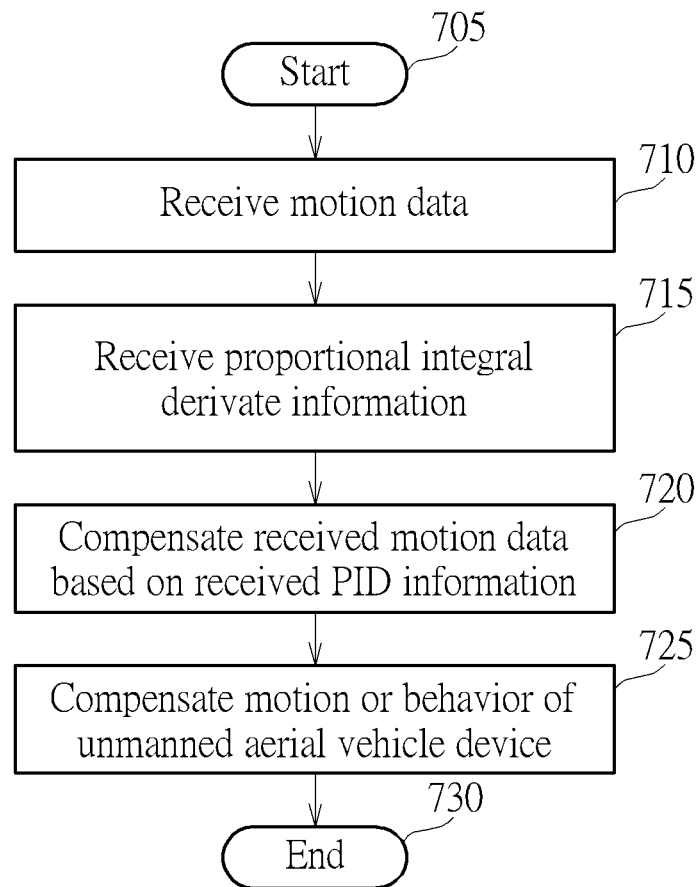
FIG. 7 is a diagram showing a flowchart of compensating the motion of an unmanned aerial vehicle device by using a motion vector generated by the optical flow sensor of FIG. 2 according to an embodiment of the invention.

FIG. 7 is a diagram showing a flowchart of compensating the motion of an unmanned aerial vehicle device by using a motion vector generated by the optical flow sensor 200 of FIG. 2 according to an embodiment of the invention. Provided that substantially the same result is achieved, the steps of the flowchart shown in FIG. 7 need not be in the exact order shown and need not be contiguous, that is, other steps can be intermediate. Steps are detailed in the following:

Step 705: Start;
Step 710: Receive or obtain motion data such as a motion vector from the optical flow sensor 200;
Step 715: Receive or obtain proportional integral derivate (PID) information from at least one of the Gyro sensor, barometer, and the acoustic sensor;
Step 720: Compensate the received motion data or motion vector based on the received PID information;
Step 725: Compensate or calibrate motion or behavior of the unmanned aerial vehicle device by using the compensated motion data or motion vector; and
Step 730: End.

Figure 8:
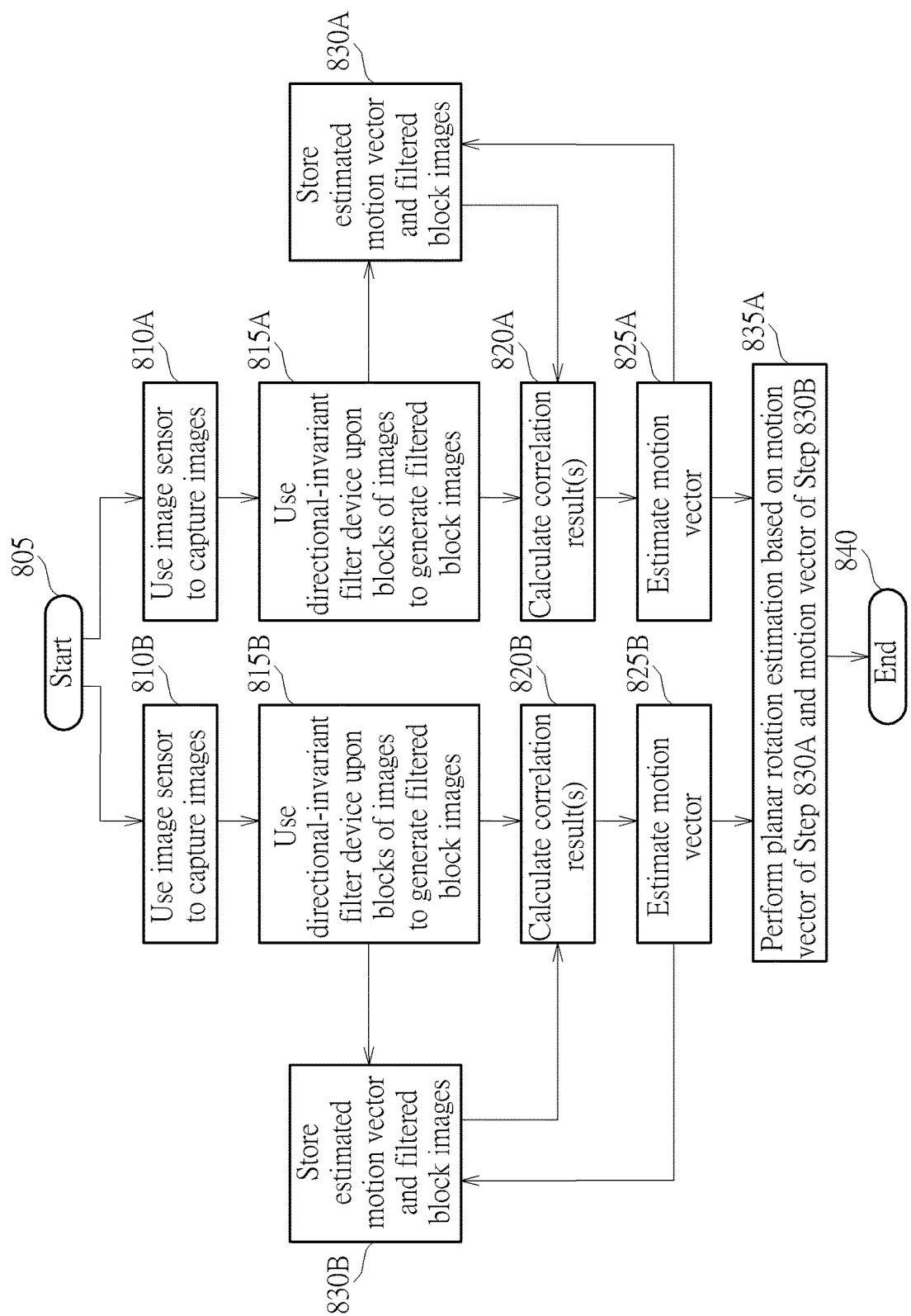
FIG. 8 is a diagram showing a flowchart of using two optical flow sensors to perform planar rotation estimation according to a second embodiment of the invention.
Figure 9:
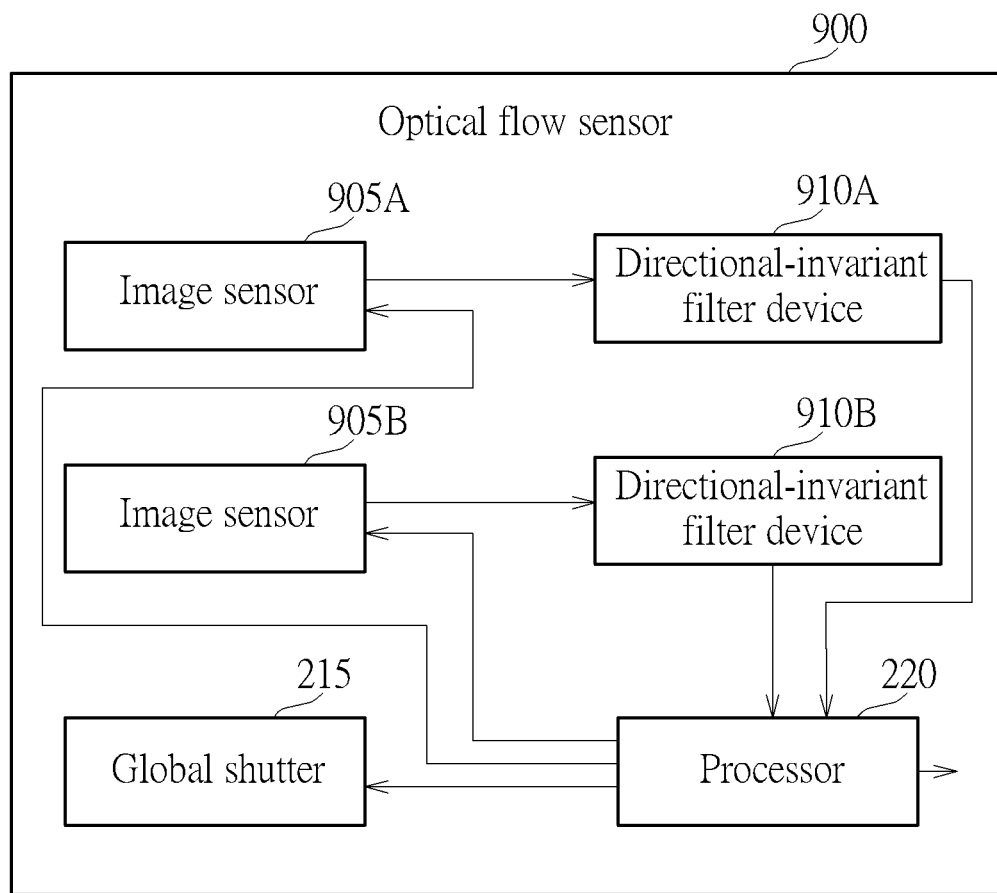
FIG. 9 is a block diagram of an optical flow sensor according to the embodiment shown in FIG. 8.

Please refer to FIG. 8 in conjunction with FIG. 9. FIG. 8 is a diagram showing a flowchart of using two optical flow sensors to perform planar rotation estimation according to a second embodiment of the invention. FIG. 9 is a block diagram of an optical flow sensor 900 according to the embodiment shown in FIG. 8. The optical flow sensing method of FIG. 8 is applied into an optical flow sensor (i.e. the sensor 900) having two directional-invariant filter devices, two image sensors, and a global shutter mechanism. The optical flow sensor 900 comprises image sensors 905A & 905B, directional-invariant filter devices 910A & 910B, and a global shutter 215, and a processor 220. Provided that substantially the same result is achieved, the steps of the flowchart shown in FIG. 8 need not be in the exact order shown and need not be contiguous, that is, other steps can be intermediate. Steps are detailed in the following:

Step 805: Start;
Step 810A: Use the image sensor 905A to capture images;
Step 810B: Use the image sensor 905B to capture images;
Step 815A: Use the directional-invariant filter device 910A upon blocks of the images to generate filtered block images;
Step 815B: Use the directional-invariant filter device 910B upon blocks of the images to generate filtered block images;
Step 820A: Calculate correlation result(s) of the filtered block images;
Step 820B: Calculate correlation result(s) of the filtered block images;
Step 825A: Estimate a motion vector according to the correlation result(s);
Step 825B: Estimate a motion vector according to the correlation result(s);
Step 830A: Store the estimated motion vector and the filtered block images;
Step 830B: Store the estimated motion vector and the filtered block images;

Step 835: Perform planar rotation estimation based on motion vector of Step 830A and motion vector of Step 830B; and Step 840: End.

The operations and functions of image sensor 905A/905B and directional-invariant filter device 910A/910B are similar to those of image sensor 205 and directional-invariant filter device 210, and are not detailed for brevity.

Figure 10:
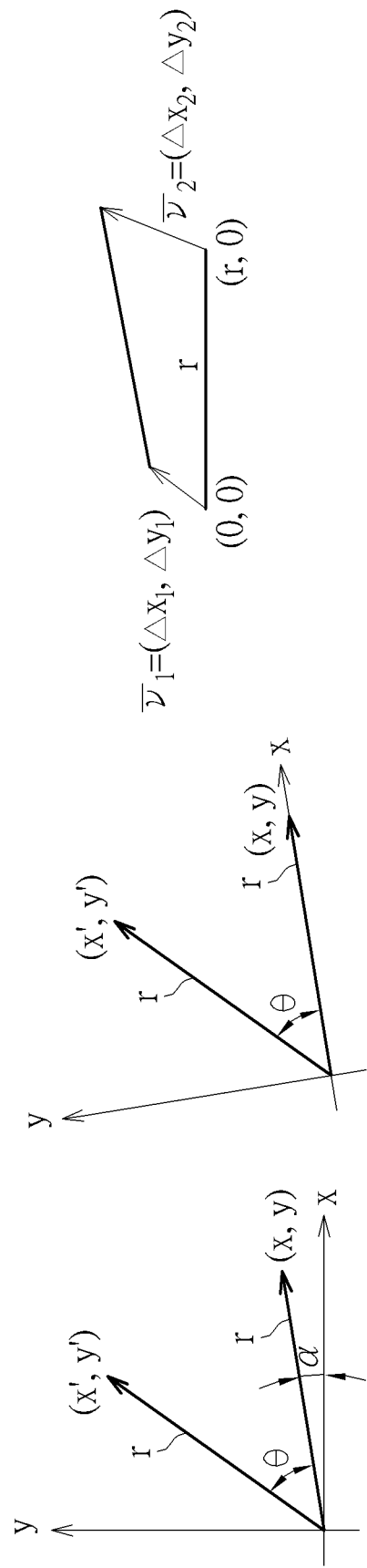
FIG. 10 is a diagram showing three coordinate systems for illustrating the procedure of estimating the planar rotation angle of motion of an unmanned aerial vehicle device or DRONE.

In Step 835, the processor 220 of sensor 900 is used for performing planar rotation estimation based on the estimated motion vector of Step 830A and the estimated motion vector of Step 830B. in practice, the two image sensors 905A and 905B of sensor 900 can be configured or positioned at different positions on the same plane. For example, the two image sensors 905A and 905B positioned at different positions on the same plane can be used for estimating the planar rotation angle of motion of an unmanned aerial vehicle device or DRONE. FIG. 10 is a diagram showing three coordinate systems for illustrating the procedure of estimating the planar rotation angle of motion of an unmanned aerial vehicle device or DRONE. As shown in left of FIG. 10, it is assumed that there are two motion vectors having the same initial point (0,0) and having different terminal points (x,y) and (x',y'). The two motion vectors have the same length or magnitude r. Also, it is assumed that the angle between the two motion vectors is equal to θ which is to be derived/estimated, and the angle between X-axis and one motion vector is equal to α. The relation between terminal points (x,y) and (x',y') can be represented by the following equations:

$$\begin{bmatrix} x' \\ y' \end{bmatrix} = \begin{bmatrix} r\cos(\alpha+\theta) \\ r\sin(\alpha+\theta) \end{bmatrix} = \begin{bmatrix} r\cos(\alpha)\cos(\theta) - r\sin(\alpha)\sin(\theta) \\ r\sin(\alpha)\cos(\theta) + r\cos(\alpha)\sin(\theta) \end{bmatrix} =$$

$$\begin{bmatrix} x\cos(\theta) - y\sin(\theta) \\ y\cos(\theta) + x\sin(\theta) \end{bmatrix} = \begin{bmatrix} \cos(\theta) & -\sin(\theta) \\ \sin(\theta) & \cos(\theta) \end{bmatrix} \begin{bmatrix} x \\ y \end{bmatrix}$$

$$\Rightarrow \begin{bmatrix} x' \\ y' \end{bmatrix} = \begin{bmatrix} \cos(\theta) & -\sin(\theta) \\ \sin(\theta) & \cos(\theta) \end{bmatrix} \begin{bmatrix} x \\ y \end{bmatrix}$$

As shown in the center of FIG. 10, if the terminal point (x,y) is approximately assigned with (r,0), the equations become:

$$\Rightarrow \begin{bmatrix} r+\Delta x \\ \Delta y \end{bmatrix} = \begin{bmatrix} \cos(\theta) & -\sin(\theta) \\ \sin(\theta) & \cos(\theta) \end{bmatrix} \begin{bmatrix} r \\ 0 \end{bmatrix}$$

$$\Rightarrow \begin{bmatrix} r+\Delta x \\ \Delta y \end{bmatrix} = \begin{bmatrix} r\cos(\theta) \\ r\sin(\theta) \end{bmatrix}$$

$$\Rightarrow \tan(\theta) = \frac{\Delta y}{r+\Delta x}$$

$$\Rightarrow \theta = \arctan2(\Delta y, r+\Delta x)$$

wherein Δx indicates x'-x, and Δy means y'-y. Thus, as shown in the right of FIG. 10, if two motion vectors $\vec{v}_1=(\Delta x_1, \Delta y_1)$ and $\vec{v}_2=(\Delta x_2, \Delta y_2)$ are estimated from the two image sensors 905A and 905B positioned at different positions on the same plane, equivalently the initial point of one motion vector can be defined at the origin (0,0) while the initial point of the other motion vector can be defined at (r,0). The above-mentioned resultant equation can be used to derive the planar rotation angle based on the estimated motion vectors:

$$\theta = \arctan2(\Delta y, r+\Delta x)$$

$$\theta = \arctan2(\Delta y_2 - \Delta y_1, r+\Delta x_2 - \Delta x_1)$$

Figure 11:
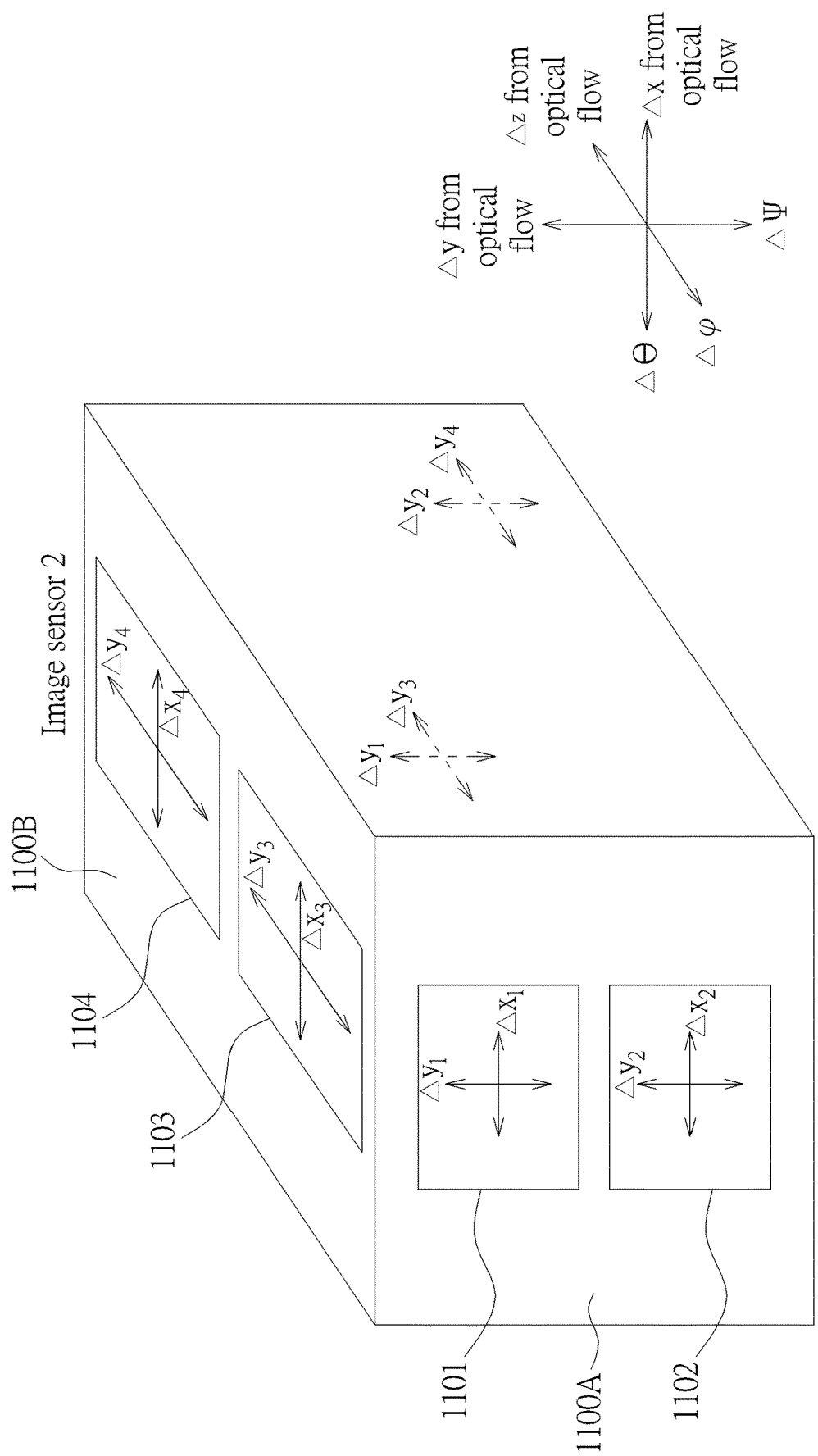
FIG. 11 is a diagram showing an example of configuring the two image sensors at different positions on different planes to respectively obtain two estimated motion vectors from two portions of captured images for estimating the six-axis data of the unmanned aerial vehicle device or DRONE according to an embodiment of the invention.

Further, in other embodiments, if the sensor 900 is applied into an unmanned aerial vehicle device or DRONE and the two image sensors 905A & 905B are positioned at different positions on different planes to respectively estimate motion vectors from different portions of captured images, the sensor 900 is capable of estimating the six-axis data of motion and behavior of the unmanned aerial vehicle device or DRONE based on merely two image sensors. The angle between the different planes can be 90 degrees or others. Please refer to FIG. 11, which is a diagram showing an example of configuring the two image sensors 905A & 905B at different positions on different planes to respectively obtain two estimated motion vectors from two portions of captured images for estimating the six-axis data of the unmanned aerial vehicle device or DRONE according to an embodiment of the invention. As shown in FIG. 11, the image sensor 905A is positioned at the plane 1100A, and the image sensor 905B is positioned at the plane 1100B which is different from the plane 1100A. In this example, the plane 1100A is configured to be vertical to the plane 1100B; however, this is not meant to be a limitation. In other examples, the angle between the plane 1100A and plane 1100B may be designed to be different from 90 degrees.

For example, the image sensor 905A positioned on the plane 1100A is arranged to capture two portions of images 1101 and 1102 to estimate the motion of the portion of image 1101 and motion of the portion of image 1102 thereby generating two motion vectors which can be represented by $(\Delta x_1, \Delta y_1)$ and $(\Delta x_2, \Delta y_2)$. For calculating/estimating each motion vector, the image sensor 905A can perform calculation based on the steps in FIG. 1; the description is not detailed. Similarly, the image sensor 905B positioned on the plane 1100B is arranged to capture two portions of images 1103 and 1104 to estimate the motion of the portion of image 1103 and motion of the portion of image 1104 thereby generating two motion vectors which can be represented by $(\Delta x_3, \Delta y_3)$ and $(\Delta x_4, \Delta y_4)$. Thus, based on the above-mentioned equations used for estimating the planar rotation angle, the processor 220 can correspondingly derive or calculate three-axis rotation angles Δφ, Δψ, and Δθ if the original state (before motion) of the unmanned aerial vehicle device (or DRONE) is treated as at the origin of the coordinate system:

$$f_\varphi[(\Delta x_1, \Delta y_1), (\Delta x_2, \Delta y_2)] = \Delta\varphi$$

$$f_\psi[(\Delta x_3, \Delta y_3), (\Delta x_4, \Delta y_4)] = \Delta\psi$$

$$f_\theta[(\Delta y_3, \Delta y_1), (\Delta y_4, \Delta y_2)] = \Delta\theta$$

wherein each of $f_\varphi[\ ]$, $f_\psi[\ ]$, and $f_\theta[\ ]$ is a function for used for generating a corresponding rotation angle based on two different vectors, and similarly such function is based on the same assumption of the above-mentioned equations used for estimating the planar rotation angle and is not detailed for brevity.

Compared to the conventional mechanism adopting at least three separate image sensors positioned on three different planes to estimate the six-axis data of the DRONE, only two separate image sensors are required for the DRONE implemented with the optical flow sensor 900 to detect motions of images thereby estimating the six-axis data. The hardware costs can be significantly reduced.

Figure 12:
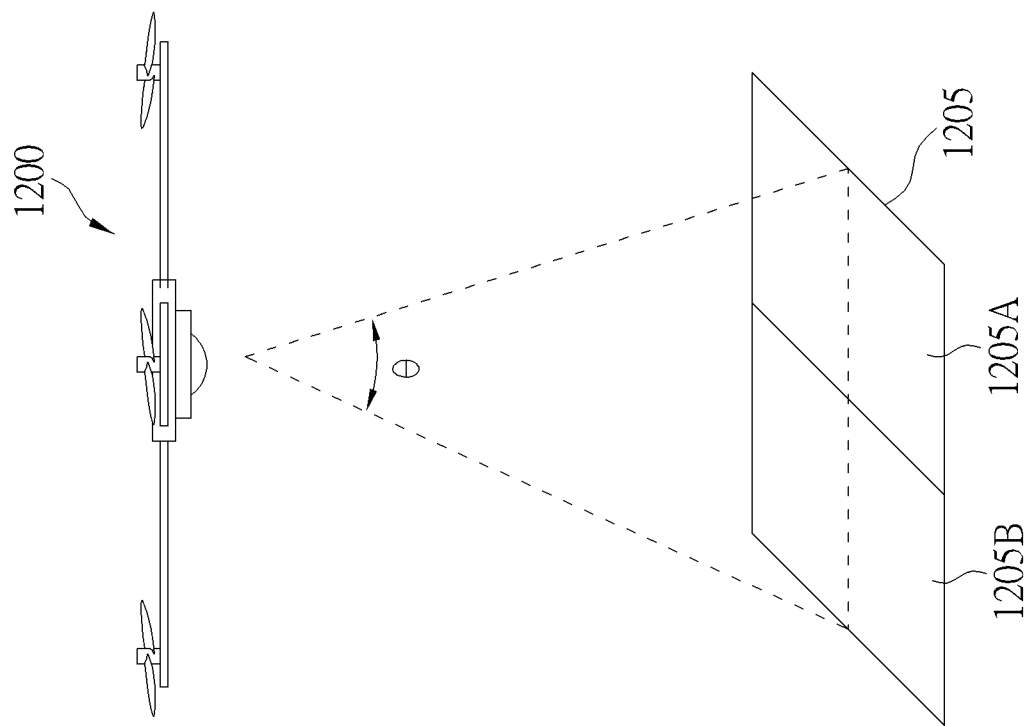
FIG. 12 is a diagram showing an example of implementing the optical flow sensor into a rotatable electronic device such as an unmanned aerial vehicle device.
Figure 13:
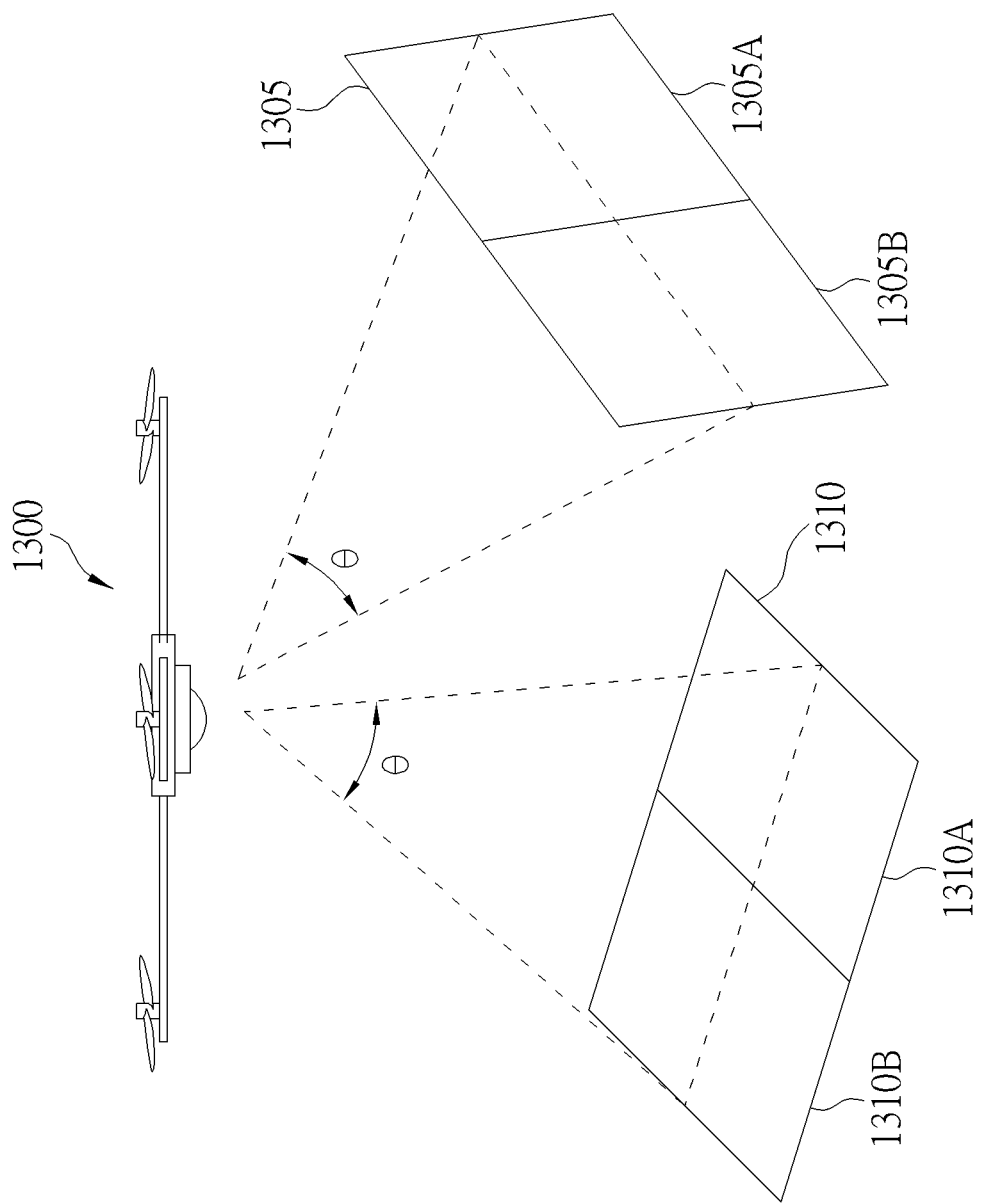
FIG. 13 is a diagram showing another example of implementing the optical flow sensor into a rotatable electronic device such as an unmanned aerial vehicle device.
Figure 14:
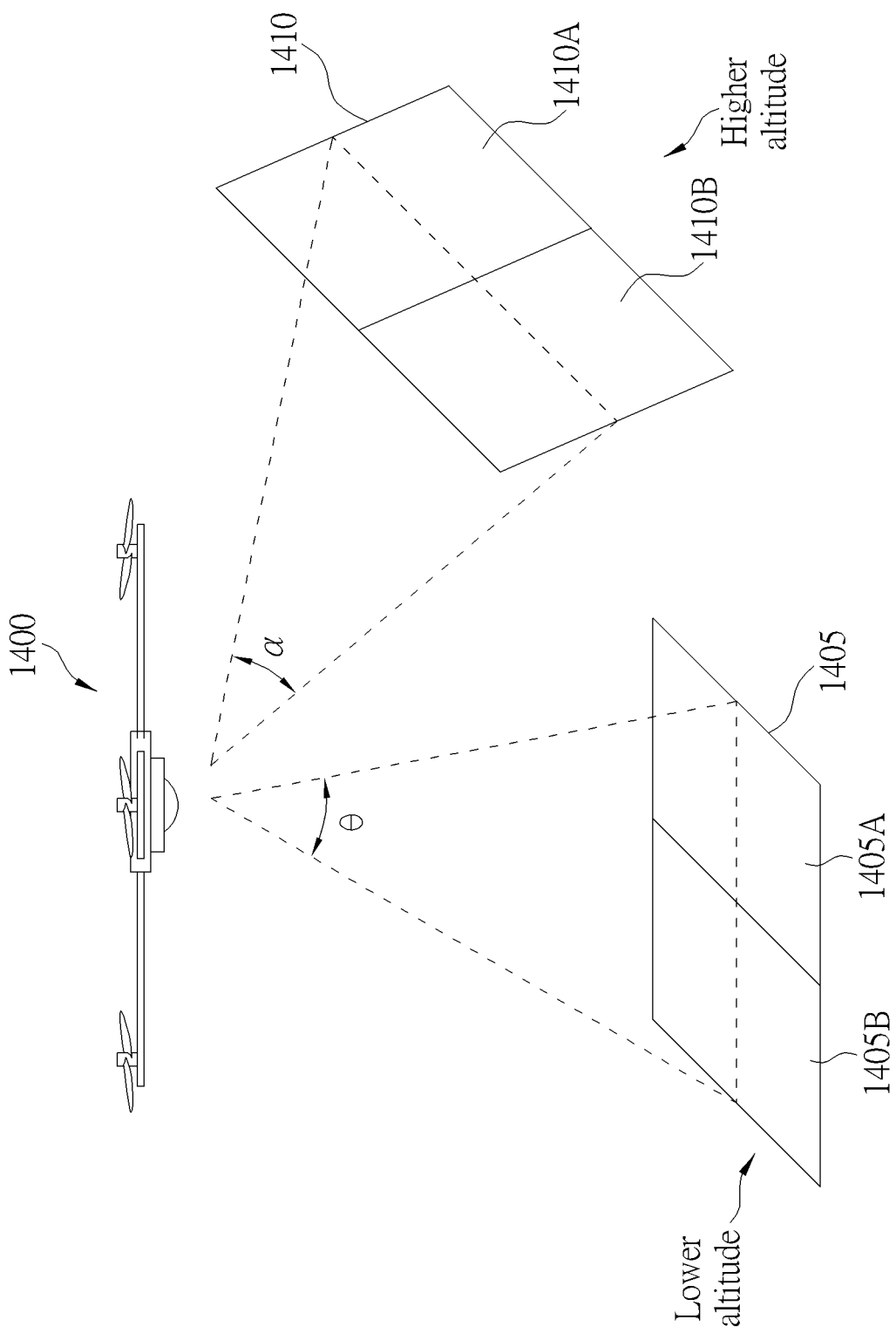
FIG. 14 is a diagram showing another different example of implementing the optical flow sensor into a rotatable electronic device such as an unmanned aerial vehicle device.

In order to more clearly describe the estimation of motion of an unmanned aerial vehicle device based on the scheme of the invention, FIG. 12, FIG. 13, and FIG. 14 respectively show different examples of implementing the optical flow sensor 200/900 into rotatable electronic devices such as unmanned aerial vehicle devices. As shown in FIG. 12, an unmanned aerial vehicle device 1200 is implemented with the optical flow sensor 200 having the single one image sensor 205. For example, the image sensor 205 is installed on the bottom of the unmanned aerial vehicle device 1200 so as to capture images/frames with the field of view (FOV) 1205 from the angle range θ when the unmanned aerial vehicle device 1200 moves or operates in the air. In this example, two portions of each captured image/frame may be defined by the sizes of image areas 1205A and 1205B, and the directional-invariant filter device 210 can be arranged to respectively processing the two portions of the captured images/frames. Then, the processor 220 can estimate a first motion vector according to correlation results of portion of the images defined by the image area 1205A and also estimate a second motion vector according to correlation results of portion of the images defined by the image area 1205B. Finally, the processor 220 can perform planar rotation estimation to estimate and obtain a planar rotation angle according to the two estimated motion vectors. The operations of estimating motion vector(s) based on the portion(s) of images/frames are similar to the operations of Steps 110-125 of FIG. 1, and the operation of planar rotation estimation is similar to the operation of Step 835; these are not detailed for brevity.

As shown in FIG. 13, an unmanned aerial vehicle device 1300 is implemented with the optical flow sensor 900 having the two image sensors 905A and 905B. For example, the image sensors 905A and 905B can be installed on the bottom of the unmanned aerial vehicle device 1300 so as to capture images/frames with different field of views (FOV) 1305 and 1310 from the same angle range θ when the unmanned aerial vehicle device 1300 moves or operates in the air. In this example, for image sensor 905A, two portions of each captured image/frame may be defined by the sizes of image areas 1305A and 1305B, and the directional-invariant filter device 910A can be arranged to respectively processing the two portions of the captured images/frames. For image sensor 905B, two portions of each captured image/frame may be defined by the sizes of image areas 1310A and 1310B, and the directional-invariant filter device 910B can be arranged to respectively processing the two portions of the captured images/frames. Then, the processor 220 can estimate a first motion vector according to correlation results of portion of the images defined by the image area 1305A and also estimate a second motion vector according to correlation results of portion of the images defined by the image area 1305B. Also, the processor 220 can estimate a third motion vector according to correlation results of portion of the images defined by the image area 1310A and also estimate a fourth motion vector according to correlation results of portion of the images defined by the image area 1310B. Finally, the processor 220 can derive and estimate the six-axis data (including three-axis rotation angles and motion vectors corresponding three mutually vertical planes) of the unmanned aerial vehicle device 1300 based on the four motion vectors mentioned above and the functions $f_\varphi[\ ]$, $f_\psi[\ ]$, and $f_f[\ ]$ described in the previous paragraphs.

As shown in FIG. 14, an unmanned aerial vehicle device 1400 is implemented with the optical flow sensor 900 having the two image sensors 905A and 905B. For example, the image sensors 905A and 905B can be installed on the bottom of the unmanned aerial vehicle device 1400 so as to capture images/frames with different field of views (FOV) 1405 and 1410 from different angle ranges θ and α when the unmanned aerial vehicle device 1400 moves or operates in the air. 1405 indicates a wider FOV, and 1410 indicates a narrower FOV. In this example, for image sensor 905A, the sensor 905A is arranged to search objects at a lower altitude through the wider FOV 1405 to capture images of the objects. Two portions of each captured image/frame may be defined by the sizes of image areas 1405A and 1405B, and the directional-invariant filter device 910A can be arranged to respectively processing the two portions of the captured images/frames. For image sensor 905B, the sensor 905B is arranged to search objects at a higher altitude through the narrower FOV 1410 to capture images of the objects. Two portions of each captured image/frame may be defined by the sizes of image areas 1410A and 1410B, and the directional-invariant filter device 910B can be arranged to respectively processing the two portions of the captured images/frames. Then, the processor 220 can estimate a first motion vector according to correlation results of portion of the images defined by the image area 1405A and also estimate a second motion vector according to correlation results of portion of the images defined by the image area 1405B. Also, the processor 220 can estimate a third motion vector according to correlation results of portion of the images defined by the image area 1410A and also estimate a fourth motion vector according to correlation results of portion of the images defined by the image area 1410B. Finally, the processor 220 can derive and estimate the six-axis data (including three-axis rotation angles and motion vectors corresponding three mutually vertical planes) of the unmanned aerial vehicle device 1400 based on the four motion vectors mentioned above and the functions $f_\varphi[\ ]$, $f_\psi[\ ]$, and $f_f[\ ]$ described in the previous paragraphs.

It should be noted that all above-mentioned implementations of unmanned aerial vehicle devices are user for illustrative purposes and are not meant to be limitations of the invention. In other embodiments, the optical flow sensor 200 or 900 can be applied into a variety of electronic devices including other type unmanned aerial vehicle devices and/or AR/VR interactive devices.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of an optical flow sensor, comprising:
   using a first image sensor to capture a first image and a second image;
   using a first directional-invariant filter device upon at least one first block of the first image to process pixel values of the at least one first block of the first image, to generate a first filtered block image;
   using the first directional-invariant filter device upon at least one first block of the second image to process pixel values of the at least one first block of the second image, to generate a second filtered block image;
   comparing the first filtered block image with the second filtered block image to calculate a first correlation result; and
   estimating a motion vector of a motion of the optical flow sensor according to a plurality of first correlation results;
   wherein the first directional-invariant filter device comprises a plurality of directional adaptive filters with different direction enhancements, and each directional adaptive filter is applied for the at least one first block of the first image and the at least one first block of the second image.

2. The method of claim 1, wherein a position of the at least one first block of the first image corresponds to a position of the at least one first block of the second image.

3. The method of claim 1, wherein the comparing step comprises:
calculating the first correlation result by calculating a difference between pixel values of the first filtered block image and pixel values of the second filtered block image or by calculating a product value of the pixel values of the first filtered block image and the pixel values of the second filtered block image.

4. The method of claim 1, wherein the estimated motion vector is further used as a reference to calculate a first correlation result of another set of filtered block images.

5. The method of claim 1, further comprising:
detecting a status of an external control switch; and
outputting the estimated motion vector when detecting that the external control switch is at an ON state.

6. The method of claim 1, further comprising:
obtaining proportional integral derivate information from at least one of a Gyro sensor, a barometer, and an acoustic sensor;
calibrating the estimated motion vector according to the proportional integral derivate information; and
compensating motion of an unmanned aerial vehicle device.

7. The method of claim 1, further comprising:
using a second image sensor to capture a third image and a fourth image;
using a second directional-invariant filter device upon at least one second block image of the third image to process pixel values of the at least one second block image of the third image, to generate a third filtered block image;
using the second directional-invariant filter device upon at least one second block image of the fourth image to process pixel values of the at least one second block image of the fourth image, to generate a fourth filtered block image;
comparing the third filtered block image with the fourth filtered block image to calculate a second correlation result; and
estimating another motion vector of the motion of the optical flow sensor according to a plurality of second correlation results.

8. The method of claim 7, further comprising:
configuring the first image sensor with a wider field of view in a vertical direction to capture images of objects at a lower altitude to obtain the first image and the second image; and
configuring the second image sensor with a narrower field of view in the vertical direction to capture images of objects at a higher altitude to obtain the third image and the fourth image.

9. The method of claim 7, further comprising:
estimating a rotation angle according to the estimated motion vector and the another estimated motion vector.

10. The method of claim 7, further comprising:
configuring a position of the first image sensor and a position of the second image sensor at a same plane.

11. The method of claim 7, further comprising:
configuring a position of the first image sensor and a position of the second image sensor at two different planes respectively.

12. The method of claim 11, further comprising:
estimating a behavior or motion of a rotatable electronic device according to the estimated motion vector and the another estimated motion vector.

13. The method of claim 1, wherein the at least one first block of the first image excludes all pixels positioned at edges of the first image, and the at least one first block of the second image excludes all pixels positioned at edges of the second image.

14. An optical flow sensor, comprising:
a first image sensor, configured for capturing a first image and a second image;
a first directional-invariant filter device, coupled to the first image sensor, being applied for at least one first block of the first image to process pixel values of the at least one first block of the first image, to generate a first filtered block image, and applied for at least one first block of the second image to process pixel values of the at least one first block of the second image, to generate a second filtered block image; and
a processor, coupled to the first directional-invariant filter device, configured for comparing the first filtered block image with the second filtered block image to calculate a first correlation result, and for estimating a motion vector of a motion of the optical flow sensor according to a plurality of first correlation results;
wherein the first directional-invariant filter device comprises a plurality of directional adaptive filters with different direction enhancements, and each directional adaptive filter is applied for the at least one first block of the first image and the at least one first block of the second image.

15. The optical flow sensor of claim 14, further comprising:
a global shutter;
wherein the first image sensor is used with the global shutter to respectively capture the first image and the second image at different timings.

16. The optical flow sensor of claim 14, wherein the processor is arranged for:
calculating the first correlation result by calculating a difference between pixel values of the first filtered block image and pixel values of the second filtered block image or by calculating a product value of the pixel values of the first filtered block image and the pixel values of the second filtered block image.

17. The optical flow sensor of claim 14, wherein the estimated motion vector is further used as a reference to calculate a first correlation result of another set of filtered block images.

18. The optical flow sensor of claim 14, wherein the at least one first block of the first image excludes all pixels positioned at edges of the first image, and the at least one first block of the second image excludes all pixels positioned at edges of the second image.

19. A remote controller device, comprising:
the optical flow sensor of claim 13;
a control switch; and
a processing circuit, configured for detecting a status of the control switch and for outputting the estimated motion vector when detecting that the control switch is at an ON state.

20. The method of claim 1, wherein each of the plurality of directional adaptive filters with the different direction enhancements is respectively arranged to process the at least one first block of the first image and the at least one first block of the second image, to generate a plurality of first filter outputs of the at least one first block and a plurality of second filter outputs of the at least one second block; the plurality of first filter outputs and the plurality of second filter outputs are respectively used by the first directional-invariant filter device to generate the first filtered block image and the second filtered block image.

21. The optical flow sensor of claim 14, wherein each of the plurality of directional adaptive filters with the different direction enhancements is respectively arranged to process the at least one first block of the first image and the at least one first block of the second image, to generate a plurality of first filter outputs of the at least one first block and a plurality of second filter outputs of the at least one second block; the plurality of first filter outputs and the plurality of second filter outputs are respectively used by the first directional-invariant filter device to generate the first filtered block image and the second filtered block image.

* * * * *